United States Patent
Yoshimura

[11] Patent Number: 5,805,383
[45] Date of Patent: Sep. 8, 1998

[54] OPERATION SWITCHING APPARATUS FOR TAPE RECORDER WITH CONTROL CAM PLATE FOR CHANGE OF TAPE FEED MODES

[75] Inventor: Toshio Yoshimura, Kawasaki, Japan

[73] Assignee: Tanashin Denki Co., Ltd., Tokyo, Japan

[21] Appl. No.: 757,082

[22] Filed: Nov. 26, 1996

[30] Foreign Application Priority Data

Nov. 30, 1995 [JP] Japan ................................. 7-336152

[51] Int. Cl.⁶ .......................................................... G11B 5/54
[52] U.S. Cl. ............................................ 360/105; 360/137
[58] Field of Search ..................................... 360/137, 105

[56] References Cited

U.S. PATENT DOCUMENTS

| | | |
|---|---|---|
| 4,636,889 | 1/1987 | Deutsch et al. . |
| 4,802,029 | 1/1989 | Tanaka et al. . |
| 5,377,061 | 12/1994 | Yoshimura . |
| 5,581,431 | 12/1996 | d'Alayer de Costemore d'Arc . |

FOREIGN PATENT DOCUMENTS

| | | |
|---|---|---|
| 92307148.4 | 8/1992 | European Pat. Off. . |
| 0 667 613 | 8/1995 | European Pat. Off. . |
| 5-2800 | 1/1993 | Japan . |
| 7-39072 | 9/1995 | Japan . |

Primary Examiner—A. J. Heinz
Attorney, Agent, or Firm—Dickinson Wright PLLC

[57] ABSTRACT

In an operation switching apparatus for a tape recorder installed on a car etc., the present invention intends to improve a construction of a control cam plate for controlling various operation modes, to simplify mechanisms installed in the apparatus, to stabilize a control operation and to easily design a reduced size of the apparatus. A reversible rotary drive motor (16) drives a control cam plate (80) forward and backward. On the control cam plate (80) are provided a head moving cam (90) and a mode selection cam (92). A tape direction switching mechanism (100) and a FF/REW switching mechanism (120) are controlled by a common mode selection cam (90). By the control cam plate (80), various operation modes are selectively carried out. The control cam plate (80) is operatively connected to a cassette loading cam plate (60). The control cam plate (80) and the cassette loading cam plate (60) are driven by a single drive motor (16). After a cassette loading, both cam plates are disconnected.

3 Claims, 13 Drawing Sheets

OPERATION SWITCHING APPARATUS FOR TAPE RECORDER WITH CONTROL CAM PLATE FOR CHANGE OF TAPE FEED MODES

BACKGROUND OF THE INVENTION

1. Field of the Invention

The present invention relates to an operation switching apparatus for a tape recorder which is installed on a car, etc. More especially, the invention relates to an operation switching apparatus for a tape recorder having a control cam plate which is reciprocally driven forward-and-backward by a reversible rotary motor. On the control cam plate are provided a cam for controlling position of a magnetic head and a mode selection cam for selectively setting various operation modes in the forward and reverse directions.

2. Description of the Related Art

In this kind of operation switching apparatus, conventionally, on a control cam plate slidably mounted on the apparatus are separately arranged a cam for controlling position of a magnetic head, a cam for setting high-speed tape feed modes (FF/REW modes) in the forward and reverse directions when a tape is fed at high speed, and a tape direction switching cam for switching the tape feed direction when the tape is in a play mode. This conventional apparatus is constructed so that each operation mode is set through a switching mechanism cooperated with the respective cams. Also, in such a mechanism, a cassette loading mechanism is driven by another motor different from a motor for driving the control cam plate.

Also, another conventional construction is well known in which setting of each operation mode and a cassette loading are carried out by a common motor, as disclosed in Japanese Utility Model Publication No. 7-39072. In this construction, two separate cam plates, that is, a cam plate for switching a tape feed direction and a cam plate for switching a play mode and a high-speed tape feed mode are provided. The cam plates are selectively driven so that a desired mode can be selected.

Further, a single cam plate is provided in order to carry out cassette loading and control of a head position, as disclosed in Japanese Patent disclosure No. 5-2800. In this construction, a reversible rotary tape feed motor is driven in order to switch FF/REW in a high-speed tape feed mode and to switch a tape direction in a play mode.

According to the above conventional construction, a cam for controlling position of a magnetic head, a cam for setting high-speed tape feed modes (FF/REW modes) and a cam for switching a tape feed direction in playing are installed on a common cam plate, respectively. However, it is necessary to provide and design each switch control mechanism corresponding to each cam, respectively. Accordingly, there is a problem that the apparatus is complicated. Further, a dispersion of precision of timing between each operation tends to be caused. In order to drive a cassette loading mechanism, another motor is required. Accordingly, there is further problem that a drive system is also complicated.

Also, according to a construction as disclosed in Japanese Utility Model Publication No. 7-39072, two cam plates are used in order to selectively set operation modes. Therefore, respective mechanisms for selectively operating each cam plate are needed. Accordingly, the drive mechanism is complicated so that a space becomes larger in order to install these mechanisms. Therefore, there is further problem that it is difficult to design a reduced size of the apparatus.

Further, according to a construction as disclosed in the above Japanese Patent disclosure No. 5-2800, reversible rotary motors must be used respectively for the motor for driving a cam plate to carry out cassette loading and control of a head position, and to set FF/REW modes, and the motor for switching a tape feed direction in playing. Accordingly, there is a problem that a control circuit is complicated.

SUMMARY OF THE INVENTION

The present invention intends to solve the above various problems pointed out in the conventional constructions. An object of the present invention is to provide an operation switching apparatus for a tape recorder for improving a construction of a control cam plate so that mechanisms installed in the apparatus to switch operation modes and to control position of a magnetic head are simplified, thereby to stabilize the control operation and to easily design a reduced size of the apparatus.

In order to achieve the above object, according to the present invention, a head moving cam and a single operation mode selection cam for selecting operation modes are formed on a control cam plate. The operation mode selection cam is shared in order to selectively set high-speed tape feed modes (FF/REW modes) in the forward and reverse directions and also to selectively set play modes in the forward and reverse directions. The operation switching apparatus includes the control cam plate driven by a reversible rotary motor.

According to the above construction, play modes in the forward and reverse directions and high-speed tape feed modes in the forward and reverse directions are selectively carried out by the single mode selection cam. Accordingly, different cams for each mode are not needed so that a control operation is carried out more accurately and stably. Further, it is possible to easily design a reduced size of the apparatus, compared to the prior art constructions using a plurality of cam plates.

Also, according to the present invention, aside from the above construction, the operation switching apparatus further comprises a loading cam plate having a cassette loading cam, and a connecting member for connecting the loading cam plate with the control cam plate, wherein, immediately after a cassette loading operation is completed by the loading cam, the control cam plate is further moved to cause the control cam plate to be disconnected from the loading cam plate.

The connection member is installed so that the cassette loading cam plate can be also driven by a motor driving the control cam plate. Thereby, it is possible to simplify a drive mechanism. Also, when the cassette loading operation is completed, the loading cam plate is separated from the control cam plate. Accordingly, a moving stroke of both cam plates are not restricted with each other in order to easily design the apparatus.

The above features and advantages of the invention will now be more fully understood from the detailed description of the preferred embodiments when the same is read with reference to the accompanying drawings.

DETAILED DESCRIPTION OF THE PREFERRED EMBODIMENTS

Figure 1:
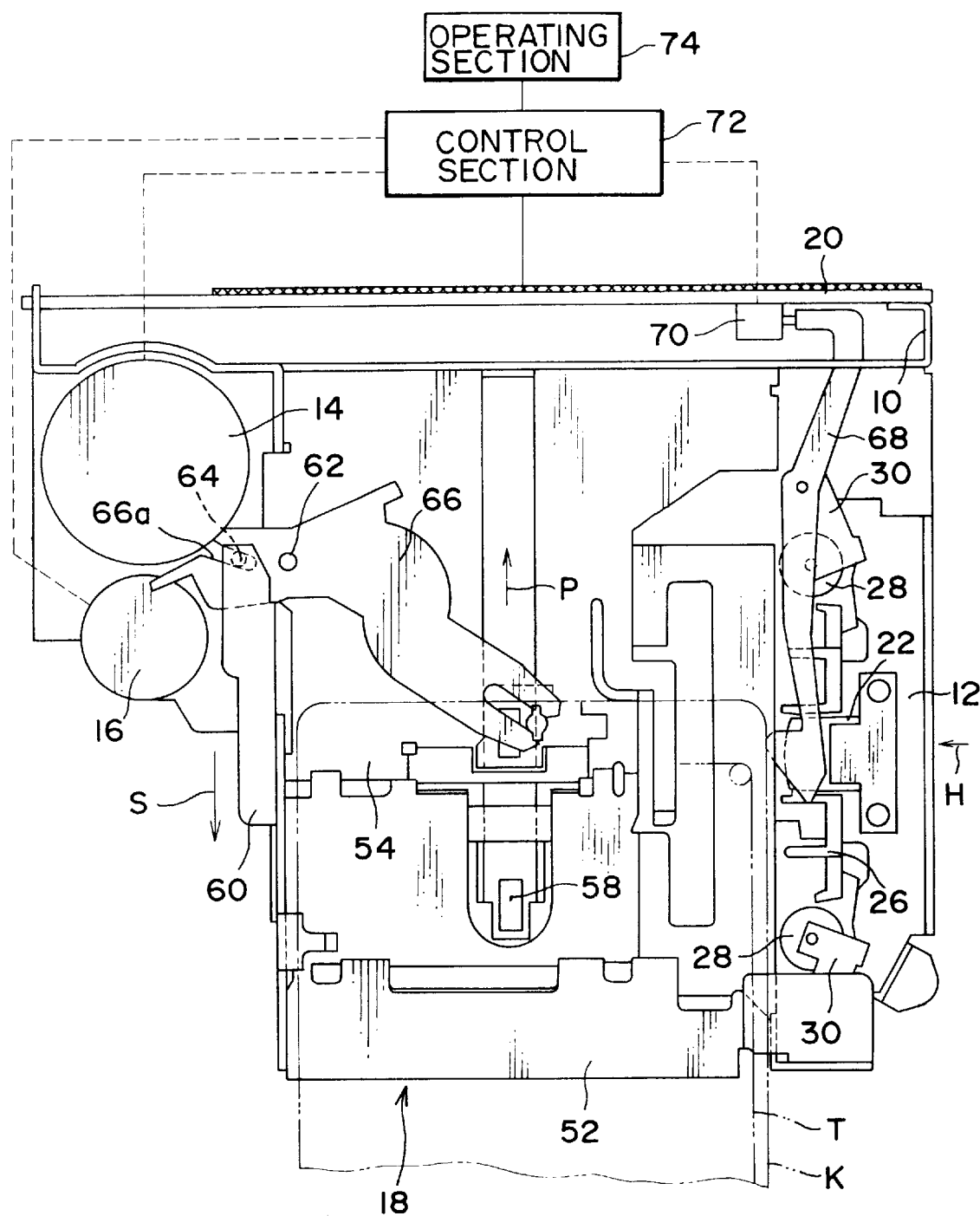
FIG. 1 is a plan view showing a tape recorder with an operation switching apparatus according to the present invention.

An embodiment of a tape recorder comprising an operation switching apparatus according to the present invention is explained below with reference to the drawings. In FIG. 1, a numeral 10 denotes a chassis of a mechanical portion of a tape recorder. A numeral 12 denotes a head substrate disposed at one side of the chassis 10. A numeral 14 denotes a tape feeding motor for feeding a tape T, disposed at the other side of the chassis 10. A numeral 16 denotes a drive motor for an operation mode switching and a cassette loading, disposed adjacent to the tape feeding motor 14. A numeral 18 denotes a cassette loading mechanism, disposed at the center portion of the chassis 10. The cassette loading mechanism 18 includes a cassette holder 52 as described below. A numeral 20 denotes a control circuit substrate disposed in an end portion at one side of the chassis 10.

A magnetic head 22 is mounted on the head substrate 12. Also, the head substrate 12 is movable between a play position and a stand-by position retreated from the play position in a direction shown by arrow H in FIG. 1 (in a direction toward the play position) or in the opposite direction. Each tape guide 26 is installed at the right and left sides of the magnetic head 22 on the head substrate 12, respectively. Each pinch roller arm 30 is rockably attached at the right and left sides of the head substrate 12, respectively.

Figure 6:
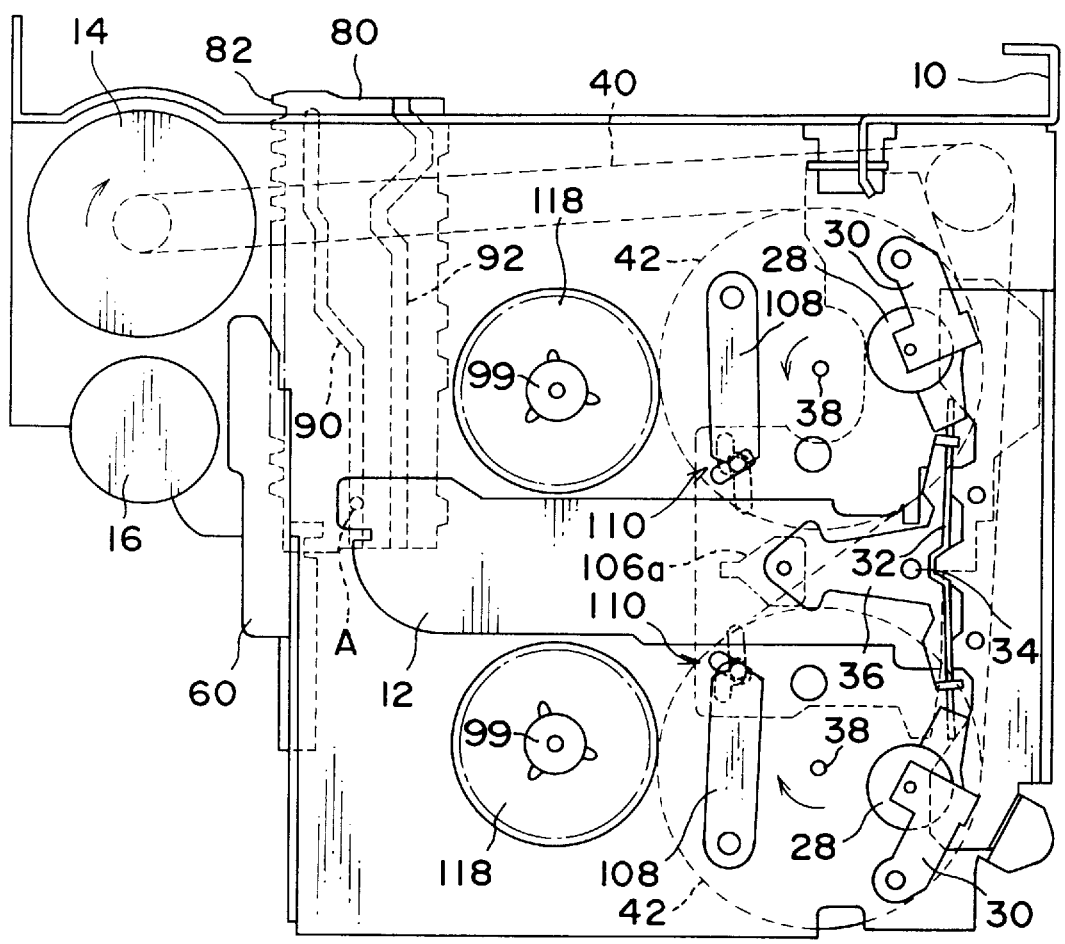
FIG. 6 is a plan view of a principal portion showing a head substrate and the associated portion shown in FIG. 1 in a state that a cassette holder and a lifter are removed therefrom.

Each pinch roller 28 is rotationally supported by the pinch roller arm 30 in order to rotate on the chassis 10, respectively. A rotary lever 36 (shown in FIG. 6) is pivotally supported on the head substrate 12 via a pivot 34. A wire spring 32 is supported by the rotary lever 36. Both sides of the wire spring 32 are engaged in a flexible end portion of the pinch roller arm 30. When the head substrate 12 is positioned in the stand-by position, the right and left pinch rollers 28 are located far from each corresponding capstan 38, respectively. The head substrate 12 is moved to the play position so that both of pinch rollers 28 are approached to the corresponding-capstan 38. One pinch roller 28 is urged against the capstan 38 by biasing force of the wire spring 32. When the rotary lever 36 is rocked, both pinch roller arms 30 are rocked in the opposite direction with each other. The one pinch roller 28 which is pressure-welded to the capstan 38 is slightly separated from the capstan 38. The other pinch roller 28 is urged against the corresponding capstan 38. In FIG. 6, a cassette holder 52 is omitted and is described later.

As shown by a dotted line in FIG. 6, the above tape feeding motor 14 drives a pair of pulleys 42 which serves as a flywheel and is fixed to the corresponding right and left capstans 38 through an endless belt 40. The motor 14 can be rotated only in the direction shown by the arrow in FIG. 6.

Figure 2:
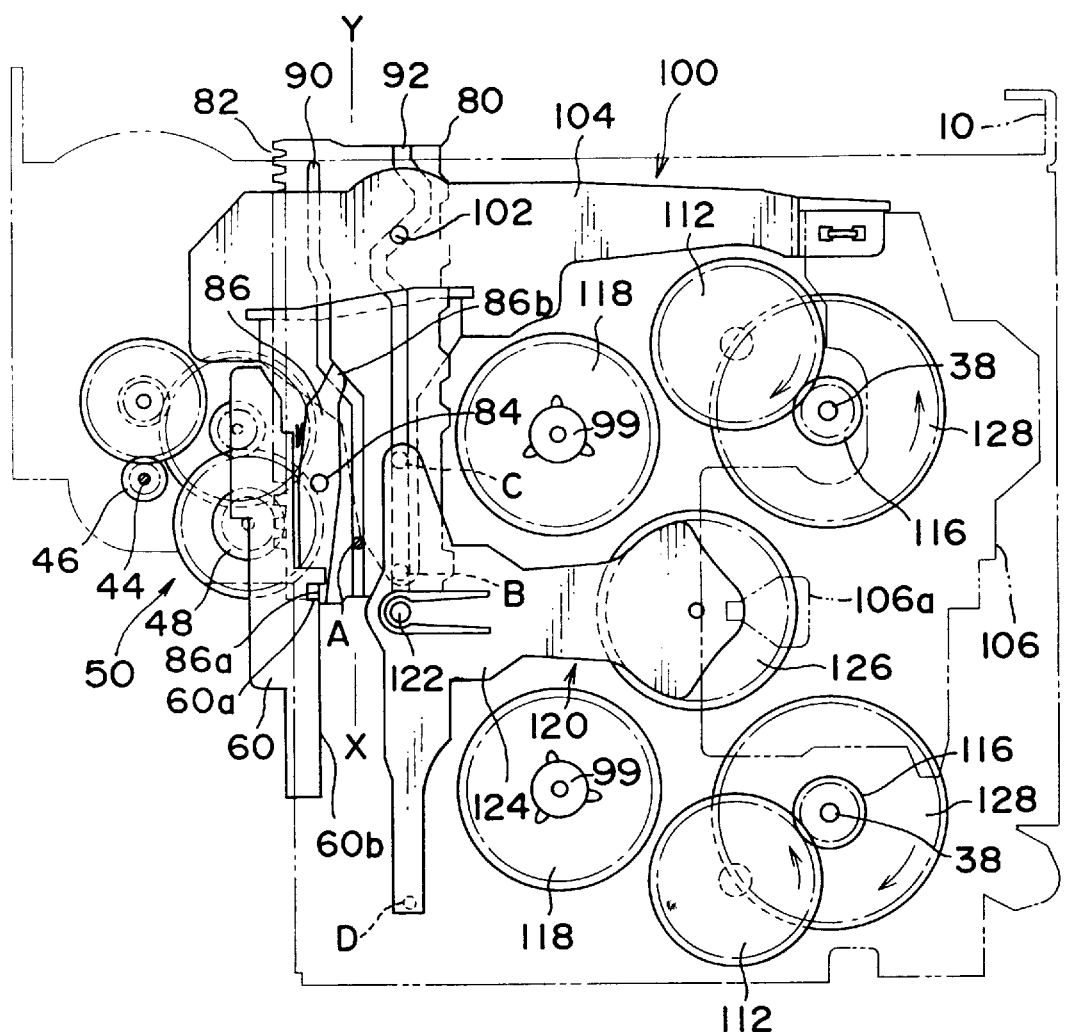
FIG. 2 is a plan view of a main construction portion of the operation switching apparatus shown in FIG. 1 with a cassette holder and a lifter removed therefrom.

As shown in FIG. 2, the drive motor 16 reduces and transmits a rotary power from a gear 46 which is fixedly attached to a motor pivot 44 to a pinion 48 via a gear reduction mechanism 50 comprising a plurality of gear trains. The drive motor 16 is a reversible rotary motor. The pinion 48 is usually engaged with a rack 82 of a control cam plate 80 described below.

A cassette holder 52 is installed in the cassette loading mechanism 18. A lifter 54 is attached to the rear end of the chassis 10 in order to be rocked upward and downward. A flexible end of the lifter 54 is connected to the cassette holder 52. A pack slider 58 is slidably attached to the lifter 54 to slide in the direction shown by an arrow P (cassette drawing direction) or the opposite direction. A loading cam plate 60 controls the movement of the holder 52 and the lifter 54 so as to move between an unloading position (lifting position) and a loading position (lowering position). A loading lever 66 is pivotally supported on the lifter 54 through a pivot 62. The loading lever 66 has an engaging recess 66a. One end of the lever 66 is engaged with the pack slider 58, and the other end thereof is engaged with a pin 64 protruded on the loading cam plate 60.

As shown in FIG. 1, a tape cassette K containing a tape T is inserted into the cassette holder 52 along the cassette drawing direction P. A reel pivot bore of the cassette K is engaged in the pack slider 58, simultaneously an end side portion of the cassette K is contacted with a cassette detection lever 68 which is pivotally supported on the chassis 10. Thus, the cassette detection lever 68 is rocked so that a detection switch 70 is turned on by the cassette detection lever 68. As shown in a block diagram in FIG. 1, the switch 70 is connected to a control section 72 on the control circuit substrate 20. The control section 72 controls the motors 14 and 16 according to an input from an operation section 74.

Figure 4:
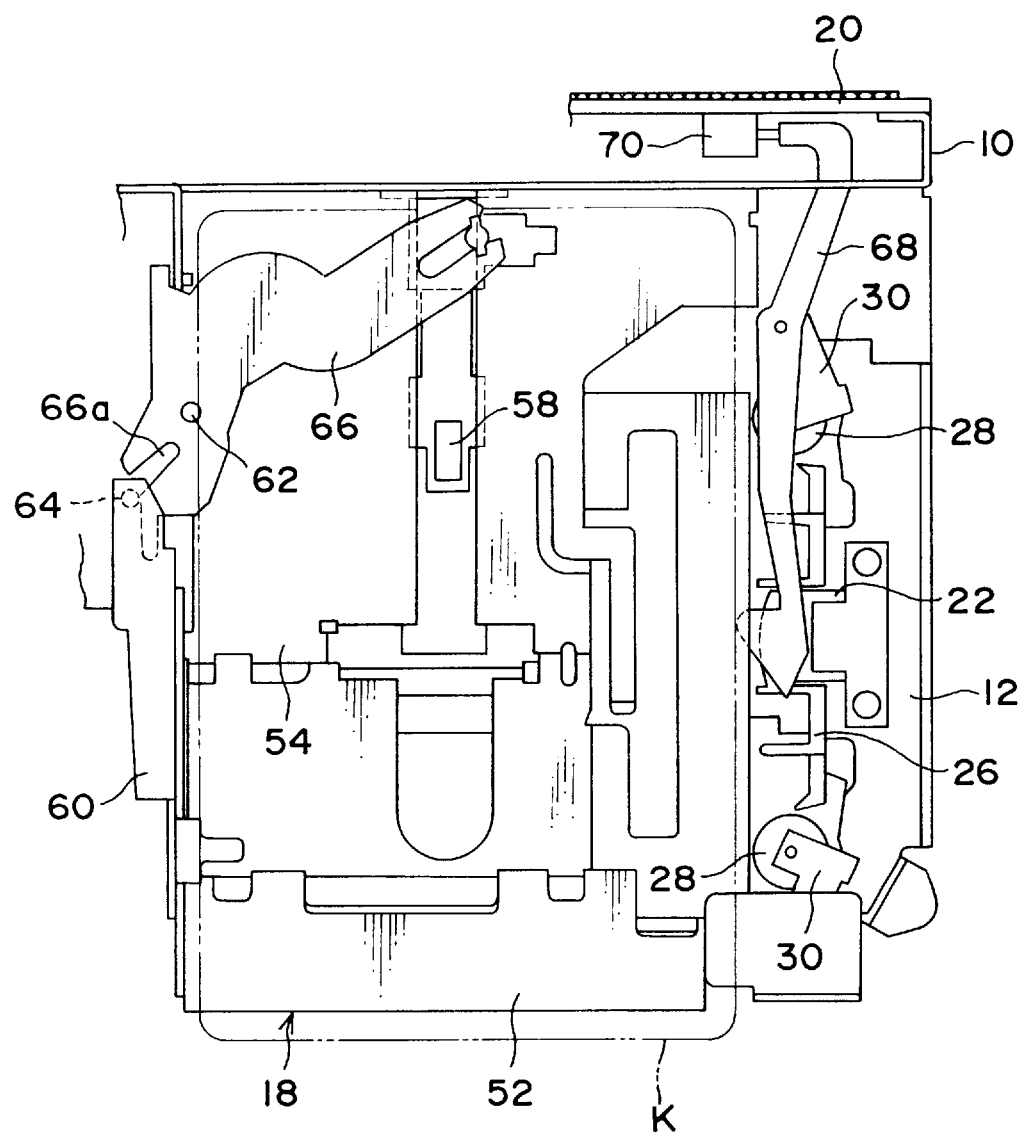
FIG. 4 is a plan view illustrating an operation of a principal portion in a state that a tape cassette is loaded.
Figure 5A:
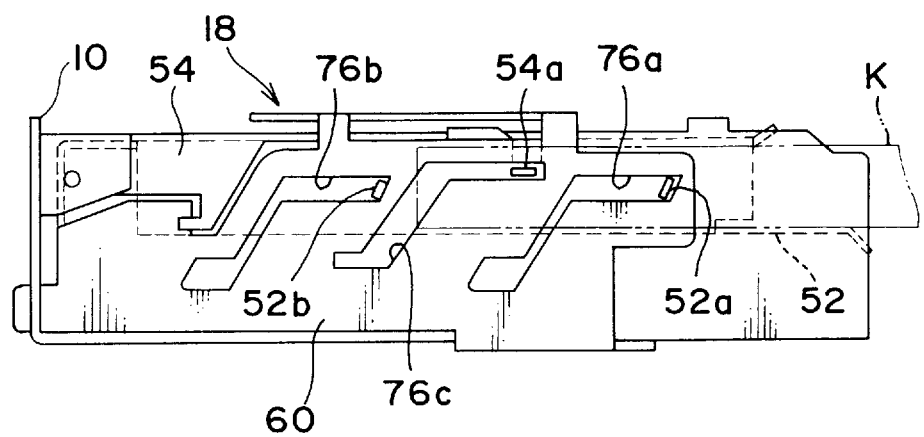
FIG. 5(a) is a side view of a loading cam plate shown in FIG. 1 at the left side in an eject state.

As shown in FIG. 4, the cassette K is drawn into the innermost end in the cassette holder 52 by the loading lever 66. The tape cassette K is inserted into the cassette holder 52 in order to be engaged in the pack slider 58. Simultaneously, the cassette detection lever 68 is rocked so that the switch 70 is turned on. The operation section 74 is carried out in order to select a desired mode. The control section 72 receives an input from the operation section 74 so that the drive motor 16 is driven. The loading cam plate 60 is driven by the drive motor 16 to move from an eject position shown in FIG. 5(a) toward a loading position as shown by an arrow S. Thus, the loading lever 66 is rocked counterclockwise around the pivot 62, since the engaging recess 66a formed on the loading lever 66 is engaged with the pin 64 on the loading cam 60 so that the rotary power is transmitted. As described above, the loading lever 66 is rocked counterclockwise so that the pack slider 58 engaged in the loading lever 66 is slid in the cassette drawing direction P. Accordingly, as shown in FIG. 4, the cassette K is drawn into the innermost end of the cassette holder 52.

The pin 64 of the loading cam plate 60 is disengaged from the engaging recess 66a of the loading lever 66. The pin 64 does not allow the loading lever 66 to rotate counterclockwise. In this case, protrusions 52a, 52b and 54a protruded on the cassette holder 52 and the lifter 54, respectively are guided at an upper horizontal portion of each loading cam 76a, 76b, 76c for cassette loading, formed on the cam plate 60. Next, the loading cam plate 60 is further moved in the arrow S so that the protrusions 52a, 52b and 54a are guided to a slant cam portion of the loading cam. Thereby, the cassette holder 52 and the lifter 54 are lowered to the loading position. At this point of time, each protrusion can be already positioned on the slant cam portion in order to move to a lower horizontal cam portion following the slant cam portion respectively. Thus, the cassette holder 52 and the tape cassette K are stably held in the loading position shown in FIG. 5(b).

On the other hand, when an eject operation is carried out, the drive motor 16 is reversed by the control section 72 which receives the input from the operation section 74. The cam plate 60 is moved toward the eject position from the loading position. The cassette holder 52 and the lifter 54 are lifted upward. Next, the loading lever 66 is rocked clockwise so that the pack slider 58 is moved in the opposite direction of the arrow P. Thereby, the cassette K can be ejected outward. A construction itself for a cassette loading operation by the loading cam plate 60 as described above is well known.

The above loading cam plate 60 receives a driving force from the drive motor 16 through the control cam plate 80. That is, as shown in FIG. 2, the control cam plate 80 is supported on the chassis 10 by appropriate guide means such as a guide rail etc . . . in order to slidably move along an axis X-Y in parallel with a moving direction of the loading cam plate 60. The rack 82 is formed at one side of the control cam plate 80 so that the rack 82 is usually engaged with the pinion 48. The rack 82 can move in either direction of the axis X-Y according to the rotational direction of the drive motor 16. A connecting member 86 is pivotally supported by the pivot 84 on the control cam plate 80. The connecting member 86 is urged clockwise (in the engaging direction) in FIG. 2 by a leaf spring 88. An engaging recess 86a is formed at one end of the connecting member 86. Usually, the engaging recess 86a is engaged with a recess 60a formed at an end edge of the loading cam plate 60, so that the loading cam plate 60 is connected to the control cam plate 80.

Accordingly, when the control cam plate 80 is moved in the direction of X from an original position shown in FIG. 2 according to the rotation of the drive motor 16, then the loading cam plate 60 is also moved in the direction S toward the loading position from the eject position.

Figure 3:
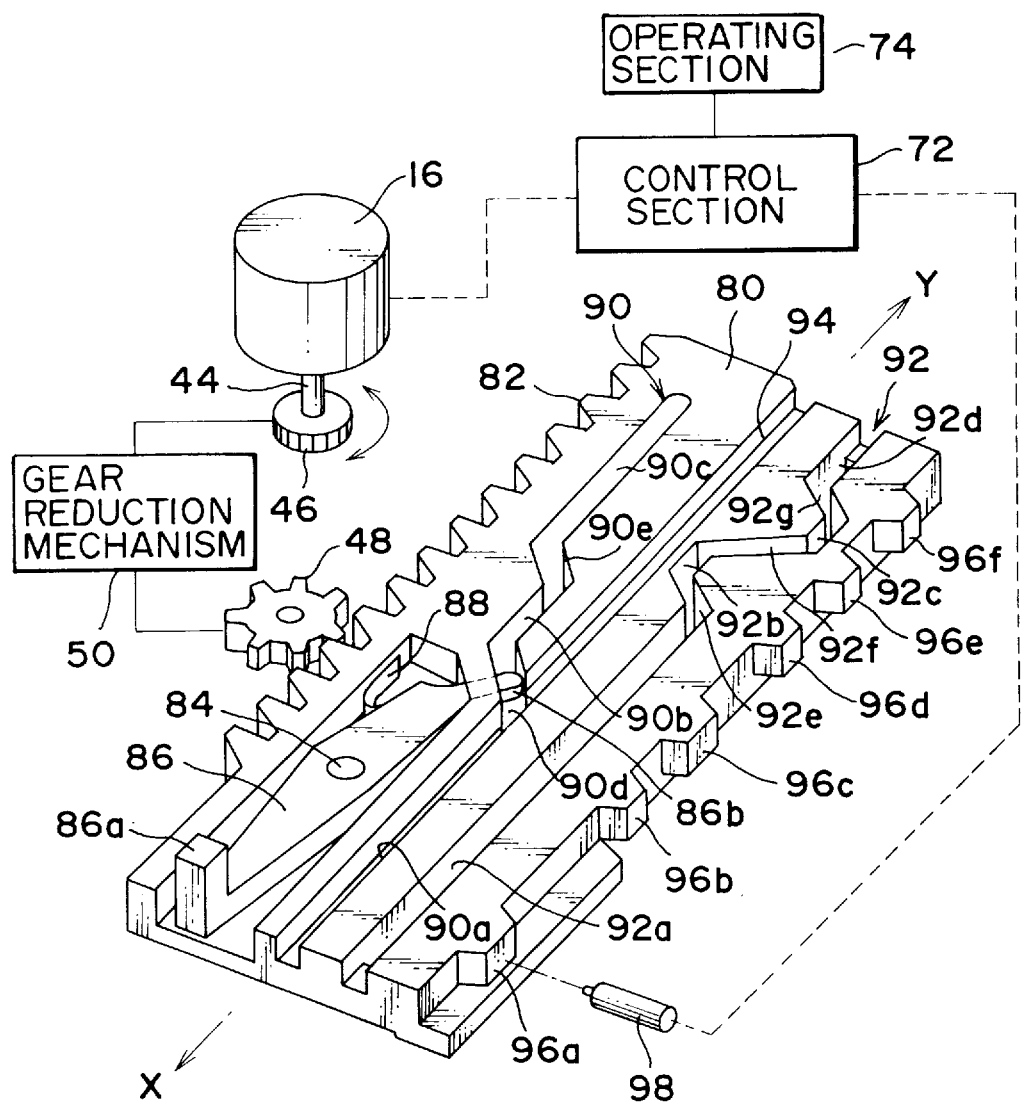
FIG. 3 is a perspective view showing a control cam plate shown in FIG. 2 with a block diagram of a control circuit.

As shown in FIG. 3, a head moving cam 90 for controlling a head position and a single mode selection cam 92 for selecting operation modes are formed as a positive cam groove on the control cam plate 80. Further, the above cam 92 is formed as a narrow through hole excepting the both ends thereof. Please note that FIG. 3 illustrates the control cam plate 80 and the connection member 86 in detail, and other figures illustrate them some schematically.

The head moving cam 90 has straight cam portions 90a, 90b and 90c in parallel with the axis X-Y and slant cam portions 90d and 90e connecting the straight cam portions 90a, 90b and 90c respectively. One end portion of the straight cam portion 90a is open at one end of the control cam plate 80. A straight groove 94 connected to the straight cam portion 90a on a straight line is provided in order to secure a track of the control cam plate 80.

The mode selection cam 92 has straight cam portions 92a, 92b, 92c and 92d in parallel with the axis X-Y and slant cam portions 92e, 92f and 92g connection the straight cam portions 92a, 92b, 92c and 92d respectively. Each end portion of the straight cam portions 92a and 92b is open at both ends of the control cam plate 80.

Protrusions 96a, 96b, 96c, 96d, 96e, 96f for detecting a position of the cam plate 80 are formed at a predetermined distance at a side edge portion opposite to the side in which the rack 82 is formed. A position detection sensor 98 is fixedly located on the chassis 10 to face the protrusions 96a–96f. When the control cam plate 80 is moved along the axis X-Y, and the position detection sensor 98 detects any one protrusion among the protrusions 96a–96f, then a detection signal is outputted and transmitted to the control section 72 to stop the drive motor 16.

The position detection sensor 98 shown in FIG. 3 is schematically illustrated. The position detection sensor 98 is used as a general sensor which can detect the protrusions 96a–96f optically or mechanically. Alternatively, a rack can be provided on the control cam plate 80 instead of the above protrusions. The rack is engaged with a pinion on which a position detector is provided. A signal is transmitted from the detector to the control section 72 to inform a moving position of the control cam plate 80. Further, as other alternative arrangement each detection hole can be formed at each detection position of the control cam plate 80. The detection holes are detected by a transmission type optical sensor. Since various detection sensors, for example, the transmission type optical sensor, may be adopted, the present invention is not restricted to the above embodiment.

A cam follower pin A mounted at the end portion of the head substrate 12 is engaged with the head moving cam 90 of the control cam plate 80. As shown in FIG. 6, the head substrate 12 is extended between both of reel pivots 99 in the transverse direction of the chassis 10. The cam follower pin A is relatively moved in the head moving cam 90 so that the magnetic head 22 is set at the stand-by position, the play position or a particular position between the stand-by position and the play position, as described below. In FIG. 2, only the cam follower pin A is shown, which is engaged with the head moving cam 90. In FIGS. 2 and 6, the magnetic head 22 is located in the stand-by position.

Figure 9:
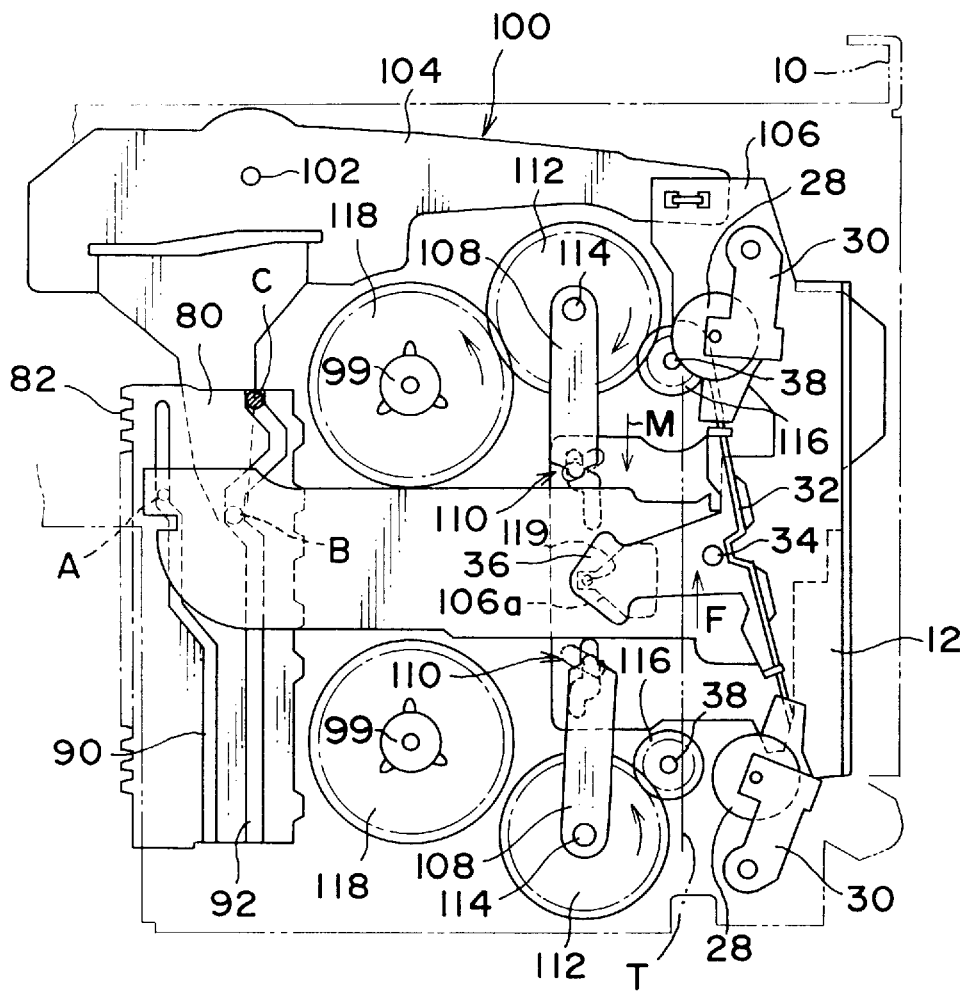
FIG. 9 is a plan view illustrating a play mode in the forward direction in the operation switching apparatus according to the present invention.

In FIG. 2, a numeral 100 denotes a tape direction switching mechanism for carrying out the play mode. In the tape direction switching mechanism 100, an L-shaped play operation direction switching lever 104 is rockably supported through a pivot 102 at the lower side of the chassis 10. A cam follower pin B is mounted at the lower surface of the end portion of the switching lever 104. The cam follower pin B is extended upwardly and is engaged with the mode selection cam 92 on the control cam plate 80 from the underside of the control cam plate 80. As shown in FIG. 9, the other end portion of the switching lever 104 is connected to one end of a forward-and-backward moving member 106. The member 106 is connected to a pair of the right and left gear support members 108 through a connection mechanism 110, respectively. Each pivot 114 of an intermediate gear 112 is rotationally supported at the free end portion of each gear support member 108.

Figure 10:
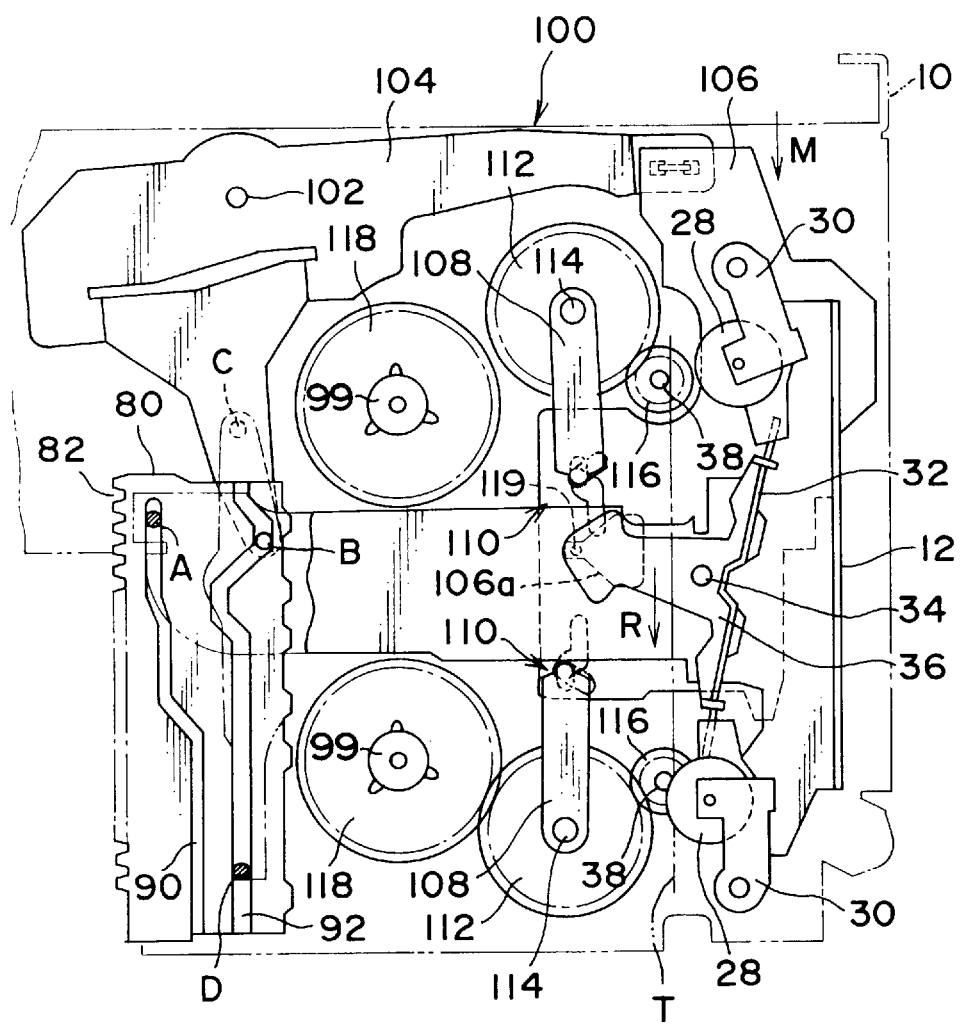
FIG. 10 is a plan view illustrating a play mode in the reverse direction in the operation switching apparatus according to the present invention.

In FIGS. 9 and 10, when the switching lever 104 is rocked clockwise around the pivot 102, the forward-and-backward moving member 106 is moved in the direction shown by an arrow M along the lower surface of the chassis 10 (FIG. 10 FIG. 9). Thus, one gear support member 108 causes the intermediate gear 112 to engage with a small diameter gear 116 fixed on the capstan 38 and also to engage with a reel gear 118, thereby to transmit the rotation of the gear 116 to the reel gear 118 so that the small diameter gear 116 and the reel gear 118 are rotated in the direction as shown by arrows. Simultaneously, the rotary lever 36 is rocked counterclockwise around the pivot 34. A pin 119 protruded at the lower surface of an end portion of the rotary lever 36 is engaged with an opening 106a formed on the forward-and-backward moving member 106. The pin 119 is moved together with the forward-and-backward moving member 106 to cause the rocking movement of the rotary lever 36.

When the rotary lever 36 is rocked, one pinch roller arm 30 is rocked by the wire spring 32 as shown in FIG. 9, so that the pinch roller 28 is urged against the corresponding capstan 38. When the capstan 38 is rotated, the tape T inserted between the capstan 38 and the pinch roller 28 is fed in the forward direction F. Thus, the play mode is carried out in the forward direction.

On the other hand, when the switching lever 104 is rocked counterclockwise around the support pivot 102, the forward-and-backward moving member 106 is moved in the opposite direction of the arrow M as shown in FIG. 10. In this case, the other intermediate gear 112 is simultaneously engaged with the small diameter gear 116 of the corresponding capstan 38 and the reel gear 118. Further, the opposite pinch roller 28 is engaged with the corresponding capstan 38. Thereby, the tape T is fed in the reverse direction so that a play mode is carried out in the reverse direction.

In FIG. 2, a numeral 120 is a switching mechanism (referred to as FF/REW switching mechanism) for switching the tape feed direction to the forward direction (FF) or the reverse direction (REW) at high-speed tape feed operation. In the FF/REW switching mechanism 120, a generally T-shaped high-speed tape feed direction switching lever (referred to as FF/REW switching lever) 124 is pivotally supported on the chassis 10 through a pivot 122. Each cam follower pin C and D is mounted at the lower surface of the end portion of the right and left extending portions of the FF/REW switching lever 124 respectively. In FIG. 2, one cam follower pin C is engaged with the mode selection cam 92 of the control cam plate 80. The pivot 122 is positioned above the straight cam portion 92a of the mode selection cam 92.

The extending portion of the FF/REW switching lever 124 is fed toward the magnetic head 22. The intermediate gear 126 is rotationally mounted at one end of the extending portion. In FIG. 2, the FF/REW switching lever 124 is located at the neutral position.

Figure 7:
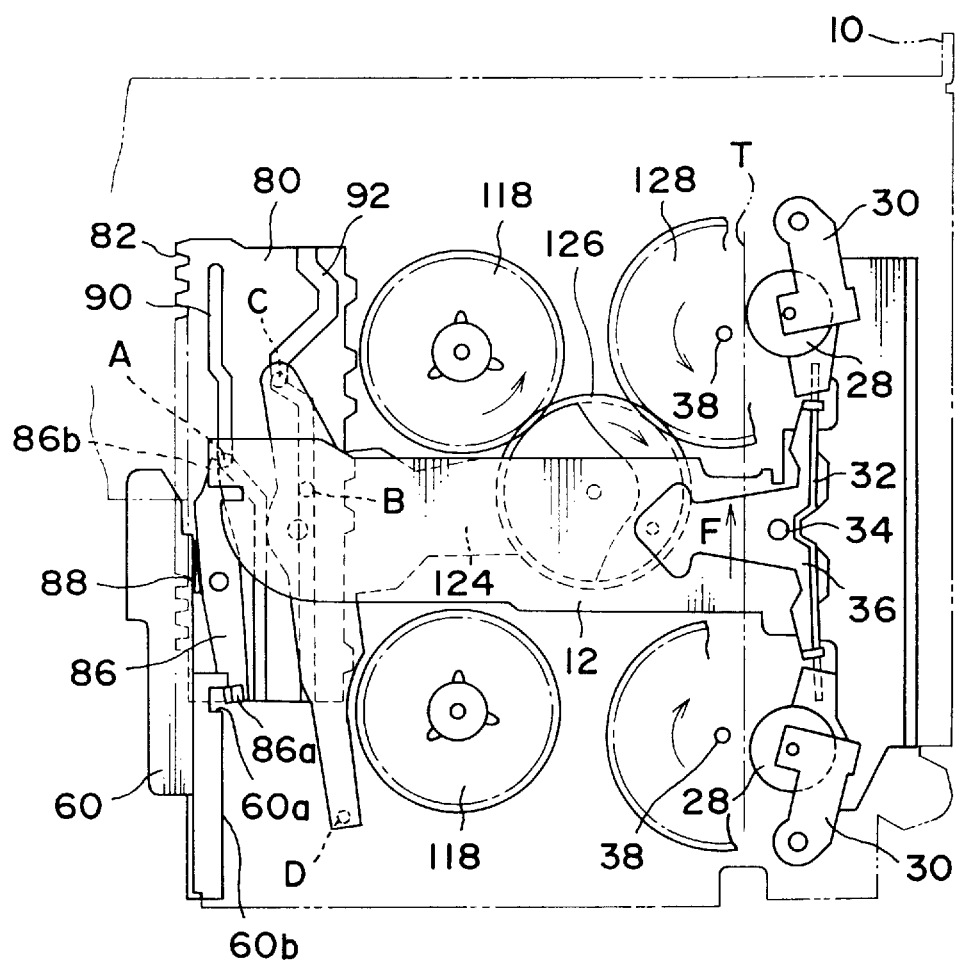
FIG. 7 is a plan view illustrating a high-speed tape feed mode in the forward direction in the operation switching apparatus according to the present invention.

As shown in FIG. 7, when the FF/REW switching lever 124 is rocked counterclockwise, the intermediate gear 126 is engaged with a large diameter gear 128 fixed to the corresponding capstan 38 and is also engaged with the reel gear 118. Since the right and left pinch rollers 28 are located far from the corresponding capstan 38, the reel gear 118 is rotated in the direction of the arrow at high speed. Thereby, the tape T is fed in the forward direction at high speed so that a high-speed tape feed mode is carried out in the forward direction.

Figure 8:
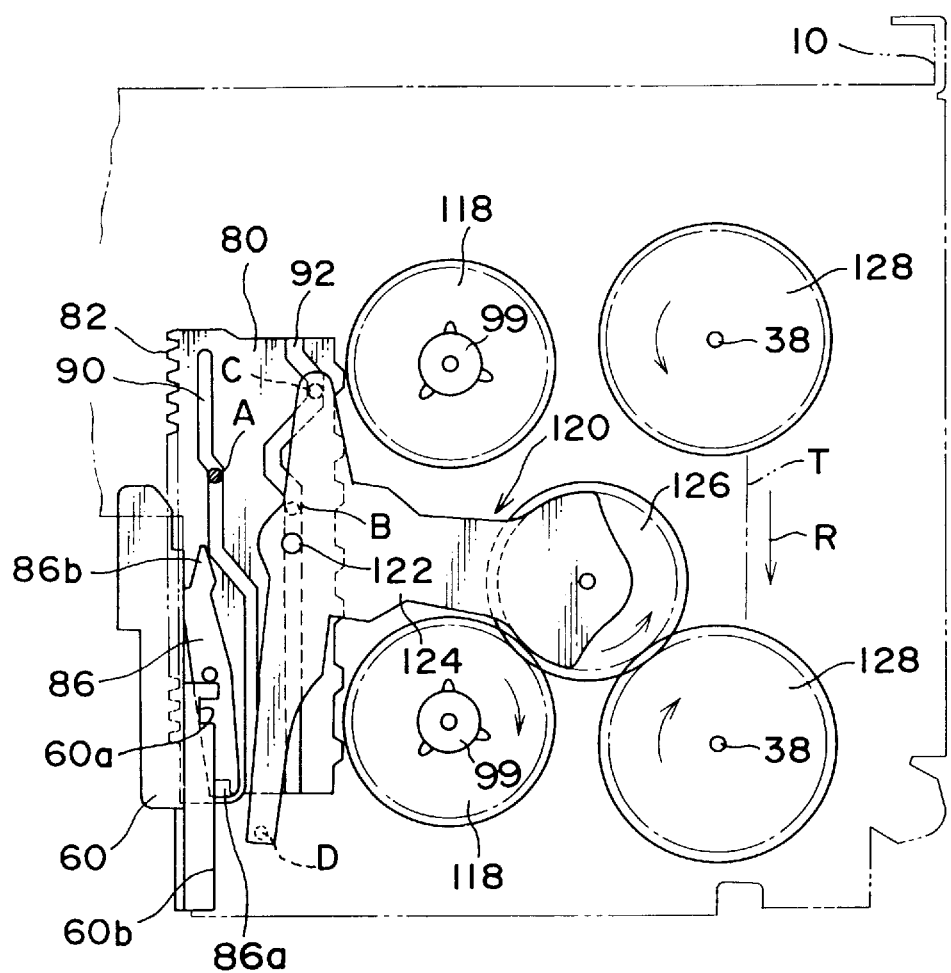
FIG. 8 is a plan view illustrating a high-speed tape feed mode in the reverse direction in the operation switching apparatus according to the present invention.

On the other hand, when the FF/REW switching lever 124 is rocked clockwise, as shown in FIG. 8, the intermediate gear 126 is engaged with the other large diameter gear 128 and the other reel gear 118, contrary to the state shown in FIG. 7. Accordingly, the other reel gear 118 is rotated at high speed. Thereby, the tape T is fed in the reverse direction at high speed so that a high-speed tape feed mode is carried out in the reverse direction.

The cam follower pin A mounted on the head substrate 12 is cooperated with the head moving cam 90 so that each above described operation is achieved. Further, the cam follower pins B, C, D mounted on the switching levers 104, 124 are cooperated with a common mode selection cam 92. Thereby, it is possible to switch the forward direction and reverse directions of the tape feed in the play mode and the high-speed tape feed mode.

A relationship of cooperation between the cams 90, 92 on the control cam plate 80 and the pins A, B, C, D is explained below referring to FIGS. 6–10 and 11.

Figure 11A:
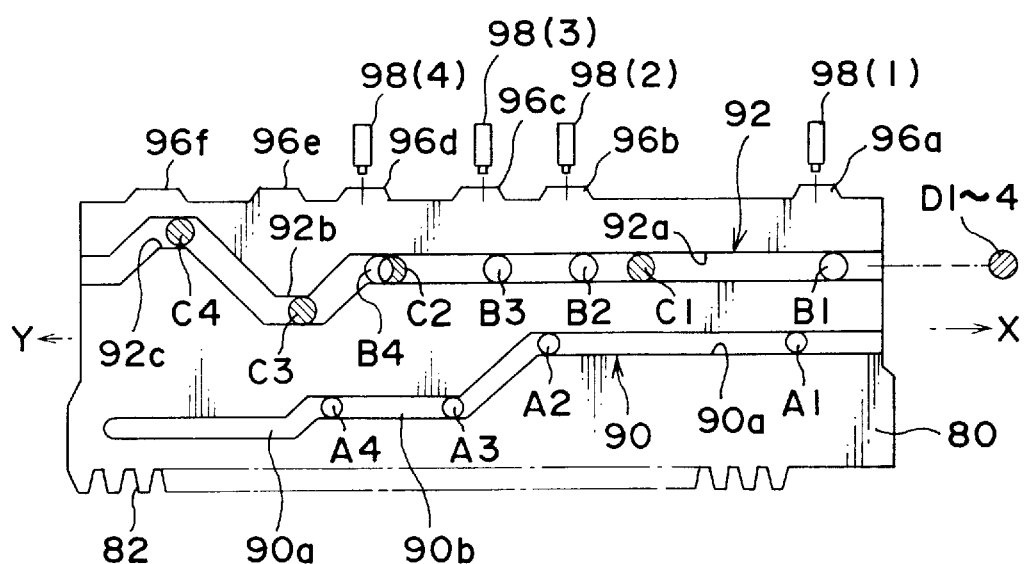
FIG. 11(a) shows operational switching states of a head moving cam and a mode selection cam on a control cam plate upon respective operations of eject, pause and play modes in the forward and reverse directions.
Figure 11B:
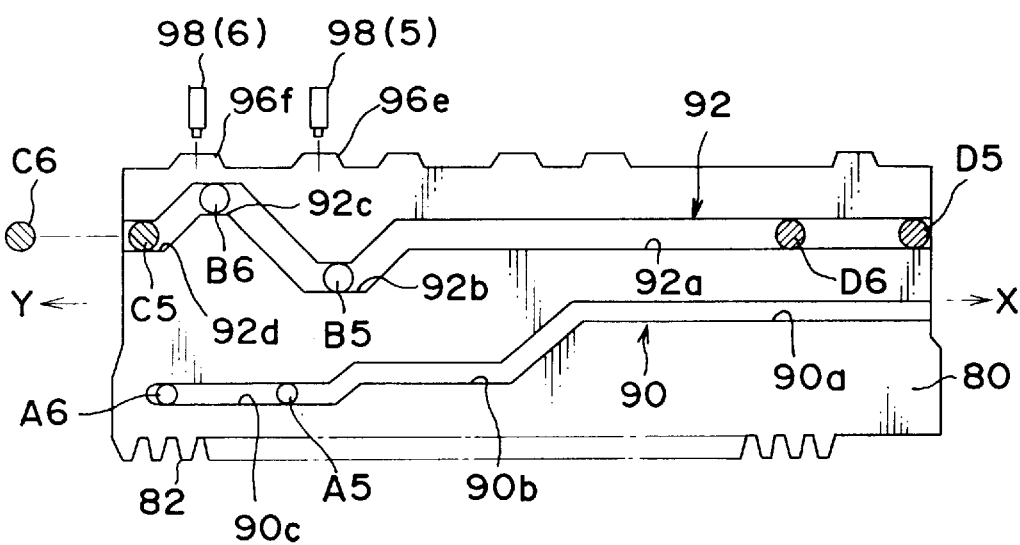
FIG. 11(b) shows operational switching states of the head moving cam and the mode selection cam on the control cam plate in the high-speed tape feed modes in the forward and reverse directions.

In FIG. 11, each sensor 98 has reference numbers (1)–(6), respectively in order to show that the sensors 98 (1)–98(6) are faced with the protrusions 96a–96f, respectively in case that the control cam plate 80 is moved in the direction of the axis X-Y. Further, each pin A–D has reference number 1–6, respectively in order to show the position of each pin in case that the sensor 98 is positioned in each detection position (1)– (6).

When the control cam plate 80 is laid on the position where the protrusion 96a is faced with the sensor 98 (1), the pin A1 is positioned at the straight cam portion 90a as shown in FIG. 11(a). The pin B1 and the pin C1 are positioned at the straight cam portion 92a, respectively. Accordingly, the head substrate 12 is positioned at the stand-by position as shown in FIG. 6. Each switching lever 104, 124 of the tape direction switching mechanism 100 and the FF/REW switching mechanism 120 is located at the neutral position in FIG. 2. In such state, the cassette K is not inserted into the cassette holder 52, or the eject operation is carried out by the operation section 74.

Next, when the control cam plate 80 is stopped at the position where the protrusion 96b is faced with the sensor 98 (2), the pins A2, B2, C2 are only moved in the same straight cam portion 90a, 92a. Accordingly, the head substrate 12 is positioned at the stand-by position so that the switching lever 104, 124 is located at the neutral position. During such operation, the loading cam plate 60 is moved together with the control cam plate 80 so that the cassette loading is completed, which will be further described later.

Next, when the control cam plate 80 is stopped at the detection position where the protrusion 96c corresponds to the sensor 98 (3), the pin A3 is moved to the next straight cam portion 90b. The pin B3 still remains at the straight cam portion 92a. The pin C3 is moved to the next straight cam portion 90b. In this case, the magnetic head 12 is positioned between the stand-by position and the play position. The switching lever 104 of the tape direction switching mechanism 100 for a playing operation is positioned at the neutral position. The FF/REW switching lever 124 is rocked counterclockwise as shown in FIG. 7. In this state, the high-speed tape feed mode in the forward direction is selected by the operation section 74.

In the above state, when the magnetic head 22 is set to be slightly contact with the tape T, then it is possible to detect an interval between a plurality of music tunes recorded in the tape T by the magnetic head, thereby to stop the tape directing motor 14 by the detection signal.

Next, when the control cam plate 80 is stopped at the position where the protrusion 96d is faced with the sensor 98 (4), the pins A4 and B4 are only moved in the same straight cam portions 90b and 92a. The pin C4 is moved to the next straight cam portion 92c. In this state, the FF/REW switching lever 124 is rocked clockwise as shown in FIG. 8. That is, the high-speed tape feed mode in the reverse direction is selected by the operation section 74.

Next, when the control cam plate 80 is stopped at the position where the protrusion 96e is faced with the sensor 98 (5), the pin A5 is moved to the further next straight cam portion 90c. The pin B5 is moved to the next straight cam portion 92b. The pin C5 is moved to the further next straight cam portion 92d. The other pin D5 of the FF/REW switching lever 124 is entered into the straight cam portion 92a. As shown in FIG. 9, the magnetic head 12 is positioned at the play position. The pin B5 is moved to the straight cam portion 92b. Thereby, the switching lever 104 is rocked clockwise. That is, the play mode in the forward direction is selected by the operation section. The switching lever 124 of the FF/REW switching mechanism 120 for the high-speed tape feed operation is engaged with the straight cam portions 92a, 92d where the pins C, D are matched in the direction of the axis X-Y with each other, respectively. Accordingly, the switching lever 124 is constrained at the neutral position.

Finally, when the control cam plate 80 is stopped at the position where the protrusion 96f is faced with the sensor 98 (6), the pin A6 is positioned in the same straight cam portion 90c. The pin B6 is moved to the next straight cam portion 92c. The pin C6 of the switching lever 124 is out of the mode selection cam 92. The other pin D6 remains in the straight cam portion 90a. As shown in FIG. 10, the switching lever 104 is rocked counterclockwise. That is, the play mode in the reverse direction is selected by the operation section 74.

As described above, the pins B, C, D of each switching lever 104, 124 are engaged with the common mode selection cam 92 in the appropriate positions thereof. Thus, it is possible to select the play modes and the high-speed fast tape feed modes in the forward and reverse directions. Accordingly, compared to the conventional construction in which different cams are separately provided, it is possible to simplify a construction of the cam plate. Further, it is possible to reduce a dimension of the control cam plate 80 thereby to easily downsize the total size of the apparatus.

As described above, the cassette K is inserted into the cassette holder 52 so that the switch 70 is turned on. A desired mode is selected by the operation section 74 so that the control cam plate 80 is driven by the drive motor 16. Thereby, the position of the control cam plate 80 is detected by the sensor 98 in order to stop the control cam plate 80 at a desired position. After a desired mode is completed to be set, the tape directing motor 14 is started in order to start a desired operation. The selection operation is carried out by the operation section 74 to switch from one operation mode to another operation mode. Accordingly, the tape feeding motor 14 and the drive motor 16 are controlled by the control section 72 only according to the input from the operation section 74. Therefore, it is not necessary for a complicated control.

When the control cam plate 80 is moved in the loading direction S, the loading cam plate 60 is also accompanied with the control cam plate 80 halfway through the connecting member 86. Accordingly, it is possible to drive the control cam plate 80 for selecting the operation mode and the loading cam plate 60 by a common drive motor 16.

According to the above construction, the length of the control cam plate 80 along the moving direction may be relatively shorter, but a moving stroke of the cam plate 80 becomes longer since it is necessary to provide a plurality of detecting portions along the moving direction to select various operation modes. On the other hand, the length of the loading cam plate 60 in the moving direction is relatively longer, but it is possible to draw the cassette K into the apparatus and to lower the cassette holder 52 within a relatively shorter stroke. Accordingly, if the loading cam plate 60 is formed integral with the control cam plate 80, both of length and stroke become longer, resulting in causing a problem of difficulty to design a reduced sized apparatus.

According to the present invention, the loading cam plate 60 is arranged to be operatively connected to the control cam plate 80 by the connecting member 86. Thus, the both cam plates 60 and 80 are moved together to complete the loading operation of the loading cam plate 60. After then, the connection between the both cam plates 60 and 80 is disconnected to allow the control cam plate 80 only to move further. For this purpose, the connecting member 86 has the end portion 86b formed at one end thereof. The end portion 86b is always urged by the leaf spring 88 to be enter the head moving cam 90 of the control cam plate 80 at the slant cam portion 90d thereof as shown in FIG. 3.

When the control cam plate 80 is moved together with the loading cam plate 60 along the loading direction S, the pin A is also relatively moved in the straight cam portion 90a. When the pin A is moved from the straight cam portion 90a to the slant cam portion 90d, the loading cam plate 60 is completed to draw the cassette K and to lower the cassette holder 52. When the pin A is moved to the slant cam portion 90d, the end portion 86b of the connecting member 86 is engaged with the pin A and is extruded against biasing force of the leaf spring 88 from the slant cam portion 90d by the pin A as shown in FIG. 7. Thus, the connecting member 86 is rocked against the leaf spring 88, so that the engaging protrusion 86a is disengaged from the recess 60a of the loading cam plate 60. Accordingly, the connection between both cam plates 60 and 80 is disconnected. That is, the pin A serves as disconnection means in association with the end portion 86b of the connecting member 86.

Figure 5B:
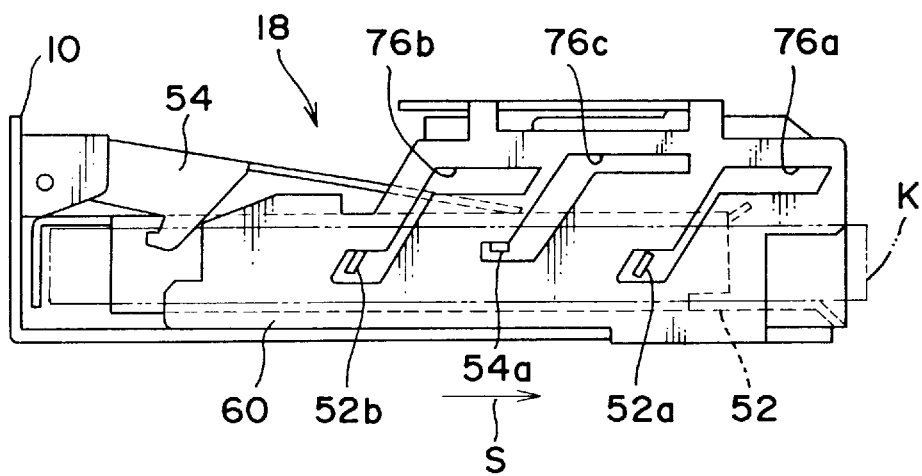
FIG. 5(b) is a side view of a loading cam plate shown in FIG. 1 at the left side in a loading state.

Accordingly, the loading cam plate 60 is held at the loading position shown in FIG. 5(b). Since then, only the control cam plate 80 moves further. The engaging protrusion 86a is slidably engaged with the side edge 60b of the loading cam plate 60 as shown in FIG. 8. The end portion 86b is held at the position out of the head moving cam 90. Accordingly, the pin A can move in the cam 90 upon its return stroke without engaging with the end portion 86b.

Thus, the connection between both cam plates 60 and 80 by the connecting member 86 can be disconnected, immediately after the loading operation of the loading cam plate 60 is completed. Thereby, it is possible to reduce the moving stroke of the loading cam plate 60 thereby to easily downsize the total size of the apparatus.

When the control cam plate 80 returns in the direction of Y, the protrusion 86a is re-engaged with the recess 60a of the loading cam plate 60, immediately before the pin A is moved from the slant cam portion 90d to the straight cam portion 90a. Since then, the control cam plate 80 moves further together with the loading cam plate 60.

Figure 12:
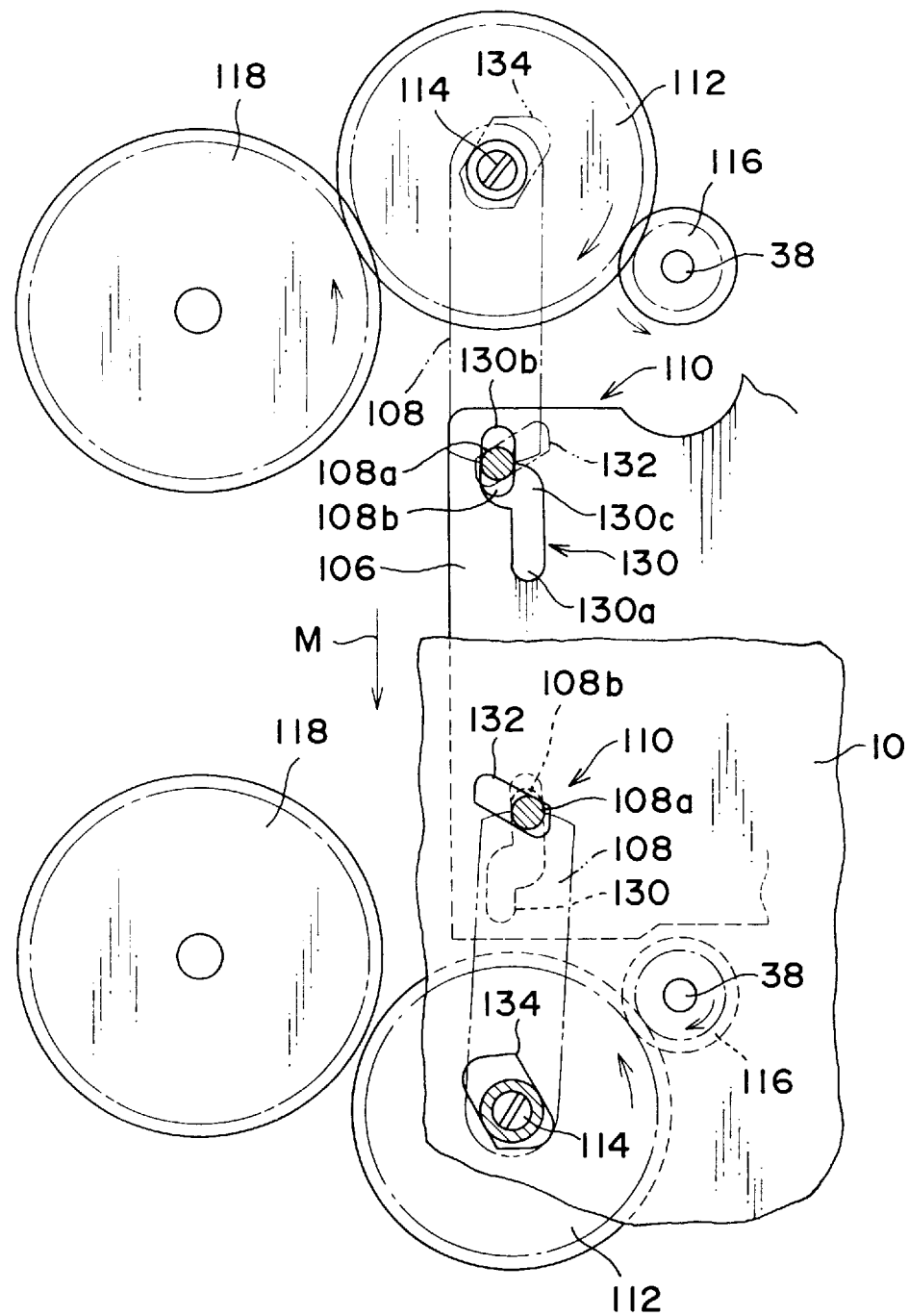
FIG. 12 is a partially enlarged view of a connection mechanism portion in a tape direction switching mechanism.
Figure 13:
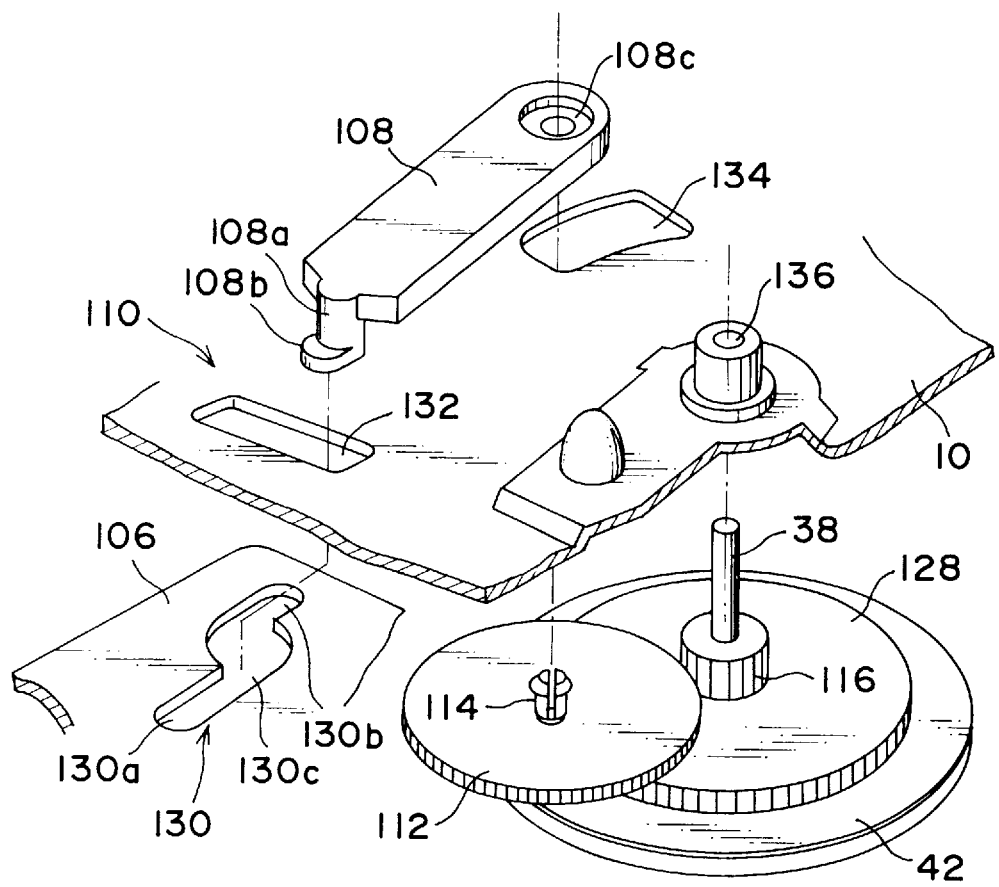
FIG. 13 is an exploded perspective view of a principal portion in the connection mechanism portion shown in FIG. 12.

FIG. 12 is a partially enlarged view showing the portion of the connection mechanism 110 of the tape direction switching mechanism 100 for a play operation shown in FIG. 9. FIG. 13 is an exploded perspective view of FIG. 12.

The connection mechanism 110 is a mechanism portion for connecting a pair of the right and left gear support members 108 relative to the forward-and-backward moving member 106 respectively. This arrangement of the connection mechanism 110 is symmetrical.

Especially, the connection mechanism 110 is clearly shown in FIG. 13. The gear support member 108 and the forward-and-backward moving member 106 are located at the opposite sides of the chassis 10 in a state that the both members 108 and 106 face to each other. The gear support member 108 has a pivot portion 108a extended in the vertical direction at the basic end portion of the gear support member 108 and an ear portion 108b extended in the transverse direction at the lower end of the pivot portion 108a. On the other hand, the forward-and-backward moving member 106 has a guide hole 130. The guide hole 130 has straight portions 130a and 130b which are extended along the moving direction of the forward-and-backward moving member 106, and a slant portion 130c connected to the straight portions 13a and 13b. A guide hole 132 is formed in the chassis 10 and is obliquely extended to the straight portions 130a and 130b of the guide hole 130.

For installation, the pivot portion 108a and the ear portion 108b of the gear support member 108 are inserted through the guide hole 132. The pivot portion 108a and the ear portion 108b are engaged with the guide hole 130 through the guide hole 132. The ear portion 108b is contacted with the lower surface of the forward-and-backward moving member 106. Thereby, it is possible to prevent the gear support member 108 from disengaging from the member 106.

The intermediate gear 112 is rotationally attached to the free end portion of the gear support member 108. As shown in FIG. 13, the support pivot 114 of the intermediate gear 112 is formed as being split pin-shaped. For installation, the support pivot 114 is passed through a guide hole 134 formed in the chassis 10. The support pivot 114 is engagedly supported by a mounting hole 108c. The guide hole 134 is shaped arcuately around the capstan 38. As shown in FIG. 13, the intermediate gear 112 is faced with the small diameter gear 116 fixed on the capstan 38 to be engaged with the small diameter gear 116. Further, the large diameter gear 128 and the pulley 42 serving as a flywheel are fixed on the capstan pivot 38. For installation, the capstan 38 is inserted through the bearing portion 136 mounted on the chassis 10.

As shown in FIG. 12, the pivot portion 108a and the guide holes 132 and 130 are engaged with the one end portion of the gear support member 108. The support pivot 114 and the guide hole 134 are engaged with the other end portion of the gear support member 108. Accordingly, the moving stroke of the gear support member 108 is restricted. Thereby, one intermediate gear 112 is restricted to the operative transmission position in which the gear 112 is engaged with the corresponding small diameter gear 116 and reel gear 118. The other intermediate gear 112 is engaged with only the small diameter gear 116. Accordingly, the other intermediate gear 112 is restricted to the inoperative transmission position in which the gear 112 is far from the reel gear 118. In FIG. 12, the intermediate gear 112 located at the top side of the drawing sheet is at the operative transmission position, and the other intermediate gear 112 located at the bottom side of the drawing sheet is at the inoperative transmission position.

According to the movement of the switching lever 104, the forward-and-backward moving member 106 is largely moved in the direction of an arrow M or the opposite direction. On the contrary, the moving stroke of the intermediate gear 112 is set to the value less than that of the member 106, since it is necessary to be rapidly engaged with and removed from the reel gear 118. The difference of moving strokes between the forward-and-backward moving member 106 and the intermediate gear 112 can be compensated by means of the guide hole 130, especially, at the elongated straight portions 130a and 130b thereof. After the moving stroke of the forward-and-backward moving member 106 reaches the moving stroke of the intermediate gear 112, the pivot portion 108a is not further moved so that only the forward-and-backward moving member 106 can be freely moved further. Accordingly, the moving stroke of the forward-and -backward moving member 106 can be designed irrespective of the moving stroke of the intermediate gear 112. Thus, it is possible to enhance a flexibility of a design. Usually, a spring, etc. is provided in order to compensate or adjust different moving strokes between the associated members. However, the connection mechanism 110 of the present invention does not use any elastic deformation means such as a spring, etc. Accordingly, there is no fear that a durability is degraded due to fatigue of the spring and so on.

The embodiment of the operation switching apparatus for the tape recorder according to the present invention is explained as above. However, the present invention is not restricted to the above embodiment. For example, an order of the various operation modes can be varied. Further, the present invention is not restricted to the tape recorder for a car, but can be applied to other tape recorders.

As described above, according to the present invention, the single mode selection cam is formed on the control cam plate in order to select the play modes and high-speed tape feed modes in the forward and reverse directions. Accordingly, it is possible to control the operation correctly and stably. Further, it is possible to easily design a reduced sized apparatus, compared to the conventional apparatus using a plurality of cam plates. Further, in the present invention, the control cam plate is arranged to be operatively connected to the loading cam plate. Therefore, the motor for driving the control cam plate is also used as the motor for a cassette loading. Further, it is possible to reduce the cost. Further, since the moving stroke of the loading cam plate is limited, it is possible to downsize the total size of the apparatus.

What is claimed is:

1. An operation switching apparatus for a tape recorder which includes a magnetic head movable between a play position in which the magnetic head cooperates with a tape for a play operation and a stand-by position retreated from said play position, and a head substrate on which said magnetic head is mounted, said head substrate being reciprocally moved together with said magnetic head, wherein, when the magnetic head is positioned in said play position to carry out the play operation, a play mode in the forward direction and a play mode in the reverse direction are selectively carried out, and wherein, when the magnetic head is positioned in said stand-by position, a high-speed tape feed mode in the forward direction and a high-speed tape feed mode in the reverse direction are selectively carried out, comprising:

a reversible motor;

a control cam plate operated to be reciprocally moved by said motor forward and backward along a predetermined axis;

said control cam plate being provided with a first cam groove and a second cam groove, said second cam groove extending throughout the length of the control cam plate to provide opposed ends that are open at respective edges of the control cam plate;

said head substrate having a first cam follower pin which is kept engaged with said first cam groove of the control cam plate;

a play operation direction switching means rockable between a first rocking position corresponding to said play mode in the forward direction and a second rocking position corresponding to said play mode in the reverse direction;

said play operation direction switching means having a second cam follower pin mounted at one end thereof, said second cam follower pin being kept engaged with said second cam groove of the control cam plate;

a high-speed tape feed direction switching means rockable between a first rocking position corresponding to said high-speed tape feed mode in the forward direction and a second rocking position corresponding to said high-speed tape feed mode in the reverse direction;

said high-speed tape direction switching means having two end portions extending in opposite directions, and third and fourth cam follower pins mounted on said two end portions respectively, said third and fourth cam follower pins being able to selectively engage with said second cam groove of the control cam plate through said opposed ends of the second cam groove.

2. The operation switching apparatus for a tape recorder according to claim 1, in which said tape recorder further includes a cassette loading mechanism for moving a tape cassette containing said tape between a loading position and an unloading position, and in which, when said cassette is positioned in said loading position, the play operation is carried out, comprising:

a loading cam plate mounted on said cassette loading mechanism, having cassette loading cam means for carrying out a cassette loading operation in which the cassette is moved from the unloading position to the loading position;

a connecting member for operatively connecting the loading cam plate to said control cam plate to move the loading cam plate with the control cam plate upon the movement of the control cam plate in one direction thereby to cause cassette loading operation by said cassette loading cam means; and means for causing said first cam follower pin to engage said connecting member to disconnect the loading cam plate from the control cam plate in association with further movement of the control cam plate in said one direction immediately after the cassette loading operation is completed by said cassette loading cam means, whereby only the control cam plate is allowed to further move in said one direction.

3. The operation switching apparatus for the tape recorder according to claim 1, in which said tape recorder further includes a pair of reel gears mounted on a pair of reels, respectively, for winding and rewinding said tape, a pair of capstan gears mounted on a pair of capstans, respectively, a pair of intermediate gears located between the reel gears and capstans, said capstan gears moving between an operative transmission position for operatively connecting said reel gears with said capstan gears and an inoperative transmission position for disconnecting said reel gears and capstan gears, wherein said pair of intermediate gears is moved alternately between the operative transmission position and the inoperative transmission position so that the play operation is switched from the play mode in the forward direction to the play mode in the reverse direction, or vice verse, comprising:

a forward-and-backward moving member connected to another end portion of said play operation direction switching means so as to move forward and backward according to the rocking movement of the play operation direction switching mean;

a pair of gear support members supporting said pair of intermediate gears, respectively; and a mechanical connection mechanism with no elastic deformation means, connected to said pair of gear support members and said forward-and-backward moving member for moving said pair of intermediate gears alternately to the operative transmission position and the inoperative transmission position through said pair of gear support members according to the movement of said forward-and-backward moving member, whereby said mechanical connection mechanism allows said forward-and-backward moving member to further move independently of said gear support members after said pair of intermediate gears reaches the operative transmission position or the inoperative transmission position.

* * * * *